US009843682B2

(12) United States Patent
Yuan et al.

(10) Patent No.: US 9,843,682 B2
(45) Date of Patent: Dec. 12, 2017

(54) METHOD AND APPARATUS FOR SUBGROUP CALL TO GROUP MEMBERS MISSING A GROUP CALL

(71) Applicant: MOTOROLA SOLUTIONS, INC, Chicago, IL (US)

(72) Inventors: Songxin Yuan, Chengdu (CN); Hai-Bo He, Chengdu (CN); Chao-Jin Luo, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/320,100

(22) PCT Filed: Jul. 21, 2014

(86) PCT No.: PCT/CN2014/082659
§ 371 (c)(1),
(2) Date: Dec. 19, 2016

(87) PCT Pub. No.: WO2016/011591
PCT Pub. Date: Jan. 28, 2016

(65) Prior Publication Data
US 2017/0171392 A1 Jun. 15, 2017

(51) Int. Cl.
H04M 3/42 (2006.01)
H04M 3/56 (2006.01)
(Continued)

(52) U.S. Cl.
CPC ............ H04M 3/56 (2013.01); H04L 5/0055 (2013.01); H04W 4/08 (2013.01); H04W 8/26 (2013.01);
(Continued)

(58) Field of Classification Search
CPC ........ H04L 29/08108; H04L 29/06442; H04M 3/56; H04M 1/72533; H04W 8/245;
(Continued)

(56) References Cited

U.S. PATENT DOCUMENTS 5,530,914 A 6/1996 McPheters
5,530,916 A 6/1996 Schultz
(Continued)

FOREIGN PATENT DOCUMENTS

AU 19862246 3/1987
AU 600909 8/1990
(Continued)

OTHER PUBLICATIONS

ETSI EN 300 392-2 v2.3.2 European Standard (Telecommunications series), Terrestrial Trunked Radio(TETRA); Voice plus Data (V+D); Part 2: Air Interface (AI), (Mar. 2001), all pages.
(Continued)

Primary Examiner — Anthony Addy
Assistant Examiner — Matthew Genack

(57) ABSTRACT

A Base Transceiver Stations (BTS) method includes managing mobile devices in range using temporary identifiers temporarily assigned to each of the mobile devices; receiving a group call grant with a list of required mobile devices for a group call; defining a representation for the required mobile devices based on the required mobile devices' respective temporary identifiers; and broadcasting the group call grant with the representation, wherein the mobile devices utilize the representation to determine if they are required mobile devices for the group call. A mobile device and a group call server are also disclosed.

16 Claims, 8 Drawing Sheets

(51) Int. Cl.

| | | |
|---|---|---|
| *H04W 8/26* | (2009.01) | |
| *H04W 4/08* | (2009.01) | |
| *H04W 72/12* | (2009.01) | |
| *H04L 5/00* | (2006.01) | |
| *H04W 76/00* | (2009.01) | |
| *H04W 84/08* | (2009.01) | |

(52) U.S. Cl.
CPC ....... *H04W 72/121* (2013.01); *H04W 76/002* (2013.01); *H04W 84/08* (2013.01)

(58) Field of Classification Search
CPC ..... H04W 76/005; H04W 4/10; H04W 84/08; H04W 4/08
USPC .............. 455/414.1, 416, 418–420, 517, 518
See application file for complete search history.

(56) References Cited

U.S. PATENT DOCUMENTS

| | | | |
|---|---|---|---|
| 6,070,069 A | 5/2000 | Yoshinaga | |
| 7,724,722 B2* | 5/2010 | Seo ....................... | H04W 36/30 370/343 |
| 8,199,740 B2 | 6/2012 | Dabbs, III et al. | |
| 8,271,631 B1 | 9/2012 | Horvitz et al. | |
| 8,331,545 B2 | 12/2012 | Lingafelt et al. | |
| 8,374,179 B2 | 2/2013 | Thomas et al. | |
| 8,463,250 B2 | 6/2013 | Quick et al. | |
| 8,493,855 B2 | 7/2013 | Oksman | |
| 8,644,484 B2 | 2/2014 | Fulton et al. | |
| 2003/0017836 A1* | 1/2003 | Vishwanathan ........ | H04L 29/06 455/517 |
| 2003/0058706 A1* | 3/2003 | Okamoto ............... | G06Q 10/06 365/200 |
| 2004/0082352 A1* | 4/2004 | Keating .................. | H04W 4/08 455/519 |
| 2005/0192041 A1 | 9/2005 | Oxley et al. | |
| 2006/0039384 A1* | 2/2006 | Dontu ..................... | H04L 45/00 370/400 |
| 2008/0069118 A1* | 3/2008 | Monier .................. | G01D 4/004 370/400 |
| 2010/0085906 A1* | 4/2010 | Yamamoto ............ | H04L 12/185 370/312 |
| 2010/0177661 A1 | 7/2010 | Dailey | |
| 2012/0120931 A1* | 5/2012 | Abraham .............. | H04W 72/121 370/338 |
| 2012/0155324 A1* | 6/2012 | Janakiraman ......... | H04L 43/028 370/254 |
| 2013/0018969 A1 | 1/2013 | Samdadiya et al. | |
| 2013/0344903 A1 | 12/2013 | Li et al. | |
| 2014/0031059 A1 | 1/2014 | Rhoads | |
| 2014/0235239 A1* | 8/2014 | Kotecha ................ | H04W 60/00 455/435.1 |
| 2015/0044997 A1* | 2/2015 | Efrati .................... | H04W 12/06 455/411 |
| 2016/0344587 A1* | 11/2016 | Hoffmann ............. | H04W 24/02 |

FOREIGN PATENT DOCUMENTS

| | | |
|---|---|---|
| CN | 101674662 A | 3/2010 |
| GB | 2265791 A | 4/1992 |

OTHER PUBLICATIONS

The International Search Report and The Written Opinion, for corresponding patent application No. PCT/CN2014/081984, filed: Jul. 10, 2014, all pages.

* cited by examiner

METHOD AND APPARATUS FOR SUBGROUP CALL TO GROUP MEMBERS MISSING A GROUP CALL

This application is a National Stage filing under 35 USC §371 of co-pending Patent Cooperation Treaty international application having Serial No. PCT/CN14/082659 (the 'PCT international application') filed on Jul. 21, 2014. This application claims priority to the PCT international application, the entire contents of which are incorporated herein by reference.

BACKGROUND OF THE INVENTION

In a radio communication system, a plurality of users, via User Equipment (UE), each wirelessly connect to various Base Transceiver Stations (BTSs) for communication. Examples of the radio communication system can include European Telecommunications Standards Institute Digital Mobile Radio (ETSI-DMR), Terrestrial Trunked Radio (TETRA), Project 25 (P25), Land Mobile Radio (LMR), and the like. In a group call, an originator places a call to members of an associated talk group. In operation, some of the members may miss the group call, but the originator still may need all the members to attend. Conventionally, the workaround to this problem, i.e., group members missing a group call, can include: i) making an acknowledged group call to know who is missing then making individual calls for all the missing members, or ii) involving a dispatcher to make a dynamic group call. There are disadvantages with both of these approaches. With the acknowledged group call, it is inefficient to poll every member, especially when the members are apart and communicating with different BTSs and there is a large number of members in the group, and it is inefficient and impractical for the originator to make a subsequent subgroup call only with missed group members. With involving the dispatcher, a third-party has to be involved and there is pre-configuration required for a dynamic group call.

Accordingly, there is a need for an improved method and apparatus for a subgroup call to group members missing a group call.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
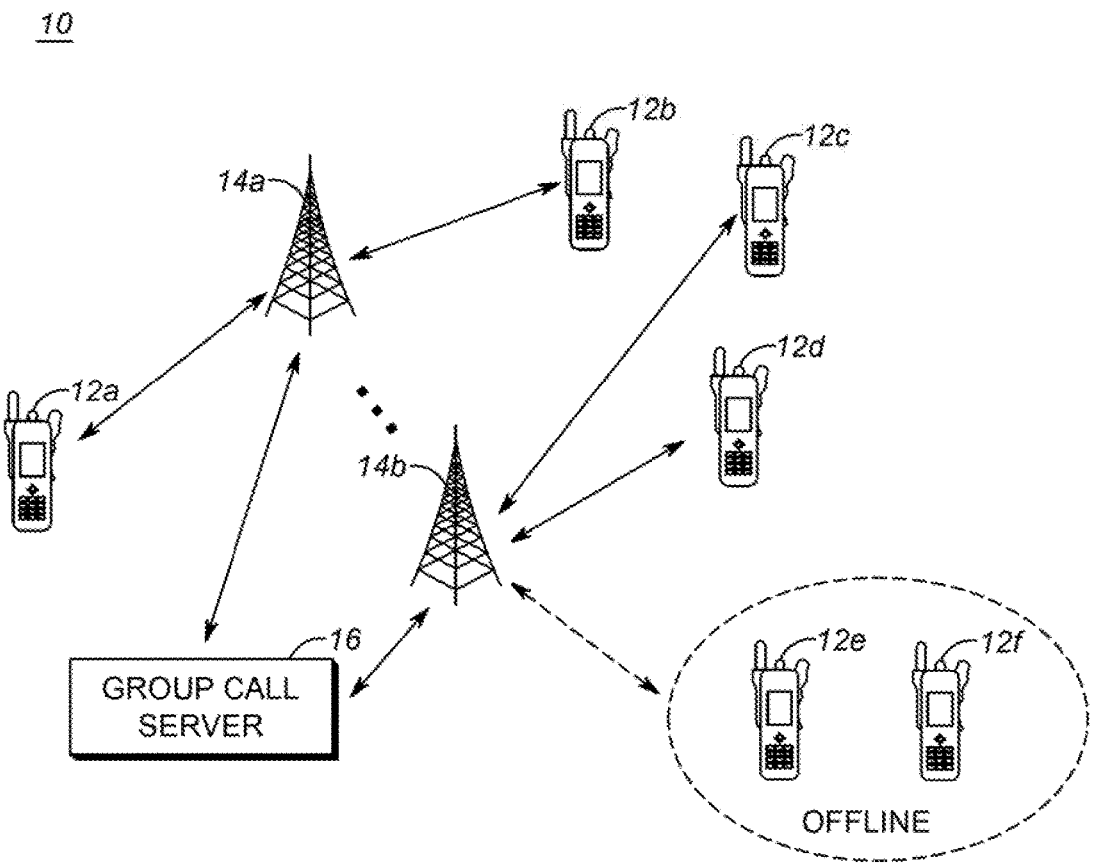
FIG. 1 is a network diagram of a radio communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a Base Transceiver Station (BTS) method includes managing mobile devices in range using temporary identifiers temporarily assigned to each of the mobile devices; receiving a group call grant with a list of required mobile devices for a group call; defining a representation for the required mobile devices based on the required mobile devices' respective temporary identifiers; and broadcasting the group call grant with the representation, wherein the mobile devices utilize the representation to determine if they are required mobile devices for the group call.

In another exemplary embodiment, a mobile device includes a wireless network interface; a processor communicatively coupled to the network interface; and memory storing instructions that, when executed, cause the processor to: connect to a Base Transceiver Station (BTS) within range of the wireless network interface; request a temporary identifier from the BTS based on a mobile device identifier and a group of the mobile device; receive the temporary identifier from the BTS; receive a group call grant message for a group call comprising a representation of temporary identifiers associated with the group; and determine whether to join the group call based on the representation.

In yet another exemplary embodiment, a group call server includes a network interface communicatively coupled to one or more Base Transceiver Stations (BTSs); a processor communicatively coupled to the network interface; and memory storing instructions that, when executed, cause the processor to: receive a group call request from an originator, wherein the group call request comprises a group identifier, which could be used to obtain list of group members; transmit the group call request to all of the one or more BTSs; receive acknowledgement status of the list of group members based on using temporary identifiers at the one or more BTSs; generate and maintain a table which records attendance of the group members based on acknowledgement status from BTSs; and initiate a subgroup call for missing group members based on the acknowledgement status.

In various exemplary embodiments, a method and apparatus for a subgroup call to group members missing a group call resolves two main defects of a normal acknowledge group call, namely efficiently determining who missed the group call and easily making a subgroup call to only missing group members. The method and apparatus, to overcome these defects, introduce a temporary identifier (tempID) between a Base Transceiver Station (BTS) or the like and users within range. The tempID is assigned to an UE of the user, and the tempID is utilized to address both efficiently determining who missed the group call and easily making a subgroup call to only missing group members.

FIG. 1 is a network diagram of a radio communication system 10 in accordance with some embodiments. The radio communication system 10 includes a plurality of mobile devices 12 (depicted as mobile devices 12a-12f) which are communicatively coupled to BTSs 14 (depicted as BTSs 14a, 14b). Again, the radio communication system 10 can include ETSI-DMR, TETRA, P25, LMR, Long Term Evolution (LTE), GSM, CDMA, or the like. The mobile devices 12 are in an associated talk group, and the mobile devices 12a, 12b are communicatively coupled to the BTS 14a and the mobile devices 12c, 12d are communicatively coupled to the BTS 14b. Note, the radio communication system 10 is presented for illustration purposes only and other embodiments are also contemplated such as including more or less of the BTSs 14, all of the mobile devices 12 connected to a same BTS 14, etc. The radio communication system 10 also includes a group call server 16 which is communicatively coupled to the BTSs 14 and to the mobile devices 12 via the BTSs 14. The group call server 16 may be a processing device that is utilized to facilitate the disclosed method and apparatus to make group calls, track users, etc. The group call server 16 can also be referred to as a zone controller (ZC) or the like.

In an exemplary operation, the mobile device 12a initiates an acknowledged group call and needs all group members (i.e., the mobile devices 12b-12f) to attend. However, in this exemplary operation, the mobile devices 12e, 12f do not receive the call grant. For example, the mobile devices 12e, 12f may be offline, out of range of the BTS 14, etc. causing them to not receive the call grant. The method and apparatus include a tempID between the BTSs 14 and the mobile devices 12 to efficiently determine acknowledgements from the mobile devices 12 and to make a limited subgroup call to the mobile devices 12 that are required but did not send acknowledgements. That is, the tempID is used to indicate which of the mobile devices 12 should join the group call (e.g., in this case, the mobile devices 12b-12f) and to indicate an order to the mobile devices 12 to send acknowledgements (ACKs) in sequence on a voice and/or control channel. Also, the tempID can be used to enable a dynamic subgroup call to only specific members of the group, e.g., the mobile devices 12e, 12f The tempID is managed between the BTSs 14 and the mobile devices 12 under control as described herein. Again, the purpose of the tempID is as follows—1) to determine who is required for a group call; 2) to determine an order for acknowledgement; 3) to efficiently determine missing members for the group call; and 4) to make a subgroup call with the missing members.

Figure 2:
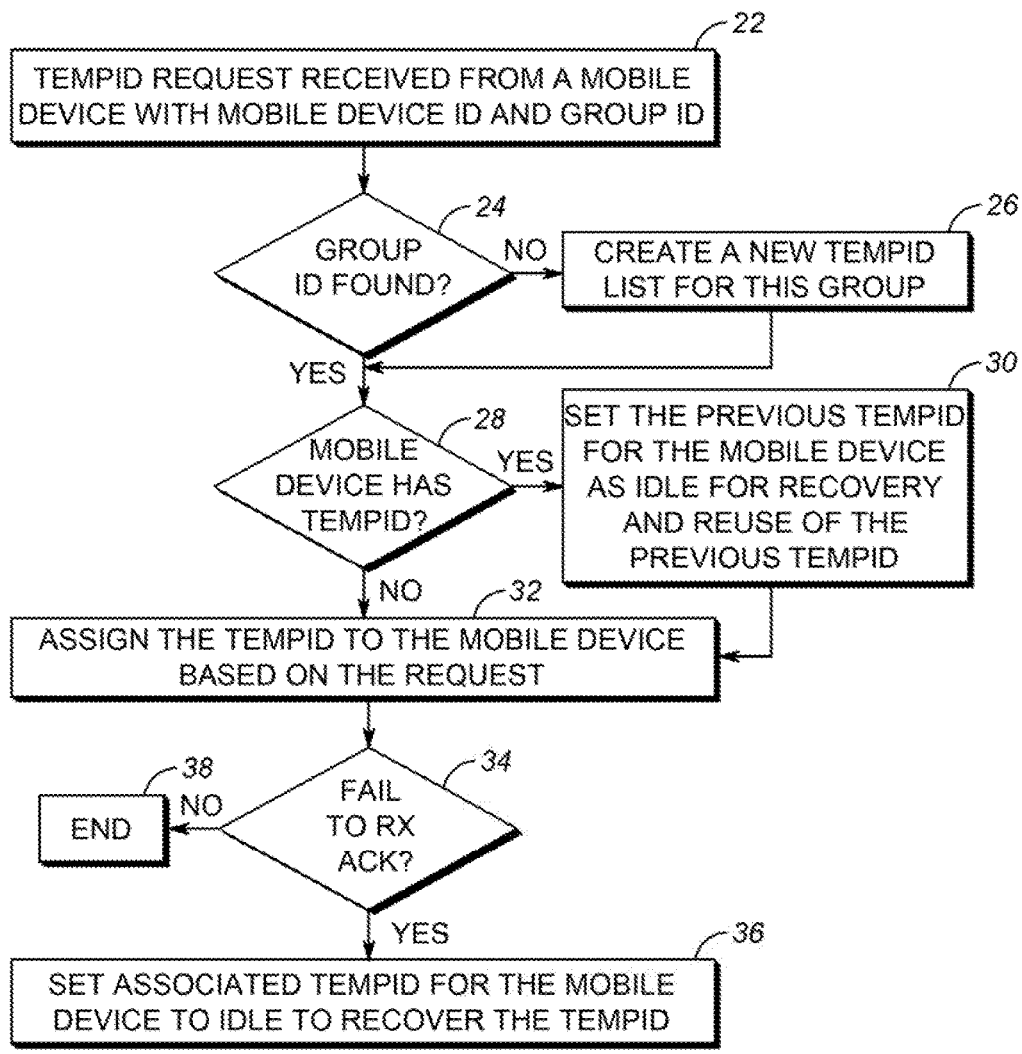
FIG. 2 is a flowchart of a BTS temporary ID (tempID) assignment process in accordance with some embodiments.

FIG. 2 is a flowchart of a BTS tempID assignment process 20 in accordance with some embodiments. The BTS tempID assignment process 20 contemplates operation by the BTS 14 in the radio communication system 10 or the like. The tempID is a number from small to big, e.g. starting at zero, and unique to each BTS 14 (but not necessarily globally unique between the BTSs 14). That is, the tempID is managed locally by each of the BTSs 14. The tempID may be stored in a data structure in the BTS 14 and may include an exemplary structure of tempID={mobile device ID, group ID}. For storage and ease of lookup, the BTS 14 may store a list of tempIDs per groupID such as groupID has the following list {(tempID$_1$, mobile device ID$_1$), (tempID$_2$, mobile device ID$_2$), . . . (tempID$_N$, mobile device ID$_N$)} and this list may be used for each groupID at the BTS 14.

In the BTS tempID assignment process 20, the BTS 14 receives a tempID request from a mobile device with an associated mobile device identifier (ID) and group identifier (ID) (step 22). Specifically, when a user with the mobile device enters the range of the BTS 14, switches to a new group (i.e., with a different group ID), or comes back into service, the mobile device 12 sends a tempID request message to the BTS 14 with its mobile device ID and the group ID that the mobile device 12 is affiliated with over a control channel. The step 22 can also occur when the mobile device 12 returns to the control channel from a non-affiliated group call, an individual call, a data call, or a temporary loss of the control channel. Also, the tempID request message can be used by the group call server 16 to track the mobile devices 12 on other channels such as for individual calls.

Upon receipt of the tempID request, the BTS 14 checks if the group ID is found in its list or record of tempIDs (list of temporary identifiers) (step 24). The BTS 14 can maintain the tempIDs by group ID and mobile device ID. If the group ID is not found (step 24), the BTS 14 can create a new tempID list for this group (step 26). Subsequent to the step 26 and if the group ID is found (step 24), the BTS 14 checks if the mobile device 12 based on its mobile device ID already has an assigned tempID (previous temporary identifier) (step 28). If the mobile device 12 does has an assigned tempID already (step 28), the BTS 14 sets the previously assigned tempID to idle for recovery and reuse (step 30). Here, the mobile device 12 is requesting a new tempID, but already has a previously assigned tempID. The BTS 14 is going to assign the mobile device 12 a new tempID and reuse the previously assigned tempID for another mobile device 12.

Subsequent to the step 30 and if the mobile device 12 does not have a tempID (step 28), the BTS 14 20 assigns a tempID to the mobile device 12 based on the tempID request (step 32). That is, the BTS 14 adds the mobile device to the tempID list as (tempID, mobile device ID). For example, the BTS 14 can assign the smallest idle tempID to the mobile device 12 for the associated group ID. This assignment can be broadcast on the control channel. Note, based on this broadcast, other mobile devices 12 can detect the tempID for the requesting mobile device 12, and if another mobile device 12 already has the same tempID for the same group, that mobile device 12 can be directed to request a new tempID since there is a duplication. At this point, the mobile device 12 has an assigned tempID based on the group ID.

The BTS 14, through the BTS tempID assignment process 20, can manage the tempIDs as well. For example, when the mobile device 12 fails to acknowledge a group call (step 34), the BTS 14 can set the associated tempID for the mobile device 12 to idle to recover the tempID for reuse. In this manner, the tempID is managed locally by the BTS 14, the mobile device 12 periodically requests a new tempID based on changing characteristics, etc.

For an exemplary operation, assume User1 sends a request with ID1 group 1 at first, the User2 sends a request with ID2 group 2, then User3 sends a request with ID3 group 2, and finally User4 sends a request with ID4 group 1. The BTS 14 would have the following tempID lists:

| Group 1 | Group 2 |
| --- | --- |
| (tempID 1, mobile device ID1 for User1) | (tempID 1, mobile device ID2 for User2) |
| (tempID 2, mobile device ID4 for User4) | (tempID 2, mobile device ID3 for User3) |

Figure 3:
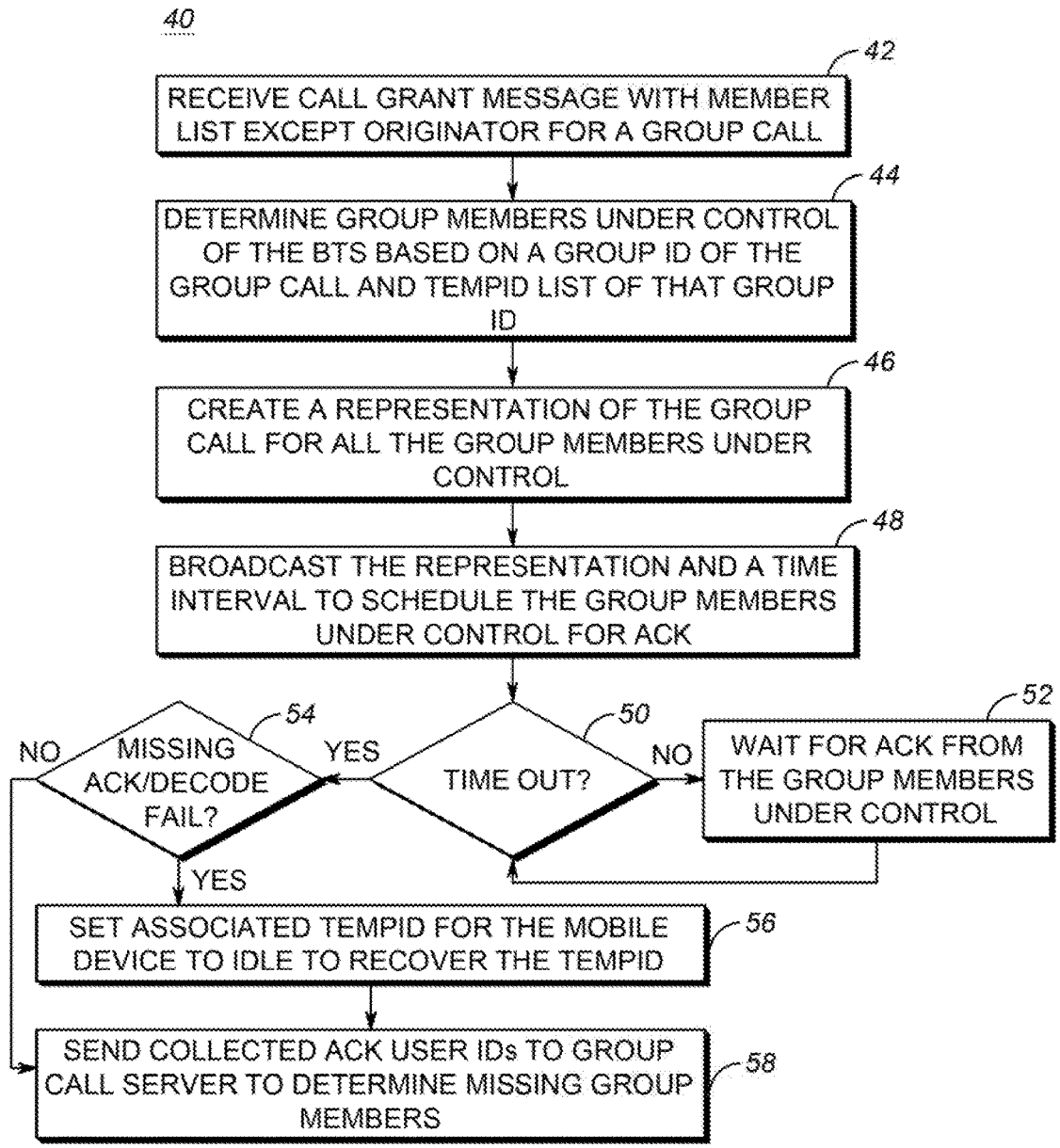
FIG. 3 is a flowchart of a group call process using the tempID to determine which mobile devices should join a group call in accordance with some embodiments.

FIG. 3 is a flowchart of a group call process 40 using the tempID to determine which mobile devices 12 should join a group call. The group call process 40 contemplates operation by the BTS 14 in the radio communication system 10 or the like. Additionally, the group call process 40 contemplates operation with the BTS tempID assignment process 20. As described herein, the tempID provides an efficient mechanism to let the mobile devices 12 know whether they are needed for a group call as well as tracking which of the mobile devices 12 have acknowledged the group call. The group call process 40 includes receiving a call grant message or the like, such as from the group call server 16, with a member list excluding an originator for a group call (step 42). The originator is the mobile device 12a in FIG. 1, i.e. the user initiating the group call. When setting up a group call which requires acknowledgment, the group call server 16 sends a group member list with each mobile device ID to the BTSs 14. The group member list includes all of the mobile device IDs for group members required for the group call. This is different from the tempID list which is managed locally by each of the BTSs 14 as this list includes group members needed for the group call regardless of their location (e.g., the group members can be in range of different BTSs 14) and regardless of their status (e.g., the group members can be online or offline, etc.).

The BTSs 14 determines which group members are under control of the BTS 14 based on a group ID of the group call and the tempID of that group ID (step 44). Specifically, the BTS 14 already has the tempID list of that group ID because it is locally managing this list, such as using the BTS tempID assignment process 20. The group member list informs the BTS 14 of which mobile devices 12 are needed for the group call. Based on the received group member list, group ID, and tempID list, the BTS 14 may find out the group members under its control, i.e. all the mobile devices 12 in the tempID list of that group ID. The BTS 14 includes creating a representation of the group call for all the group members under its control (step 46). Specifically, the BTS 14 does not have to broadcast all of the tempIDs for the group members under its control; instead, the BTS 14 can use a bit string to represent the tempIDs. For example, the tempIDs can be assigned sequentially from zero on. The BTS 14 can use each bit in the bit string to represent one tempID. For example, the representation can include the following structure:

| Bit # | 1 | 2 | 3 | 4 | 5 | 6 | 7 | ... | N |
| --- | --- | --- | --- | --- | --- | --- | --- | --- | --- |
| TempID # | 1 | 2 | 3 | 4 | 5 | 6 | 7 | ... | N |

Thus, for example, a bit string of 10100 would mean the mobile devices 12 with the first and third tempIDs are required. Thus, the representation maps tempIDs to group members needed for a particular group call for a specific group ID. Note, there would be a different representation for different group IDs. Subsequent to creating the representation, the BTS 14 broadcasts the representation and a time interval in a group call grant message to schedule the group members under control for acknowledgement of the call grant message (step 48). Upon receipt of the representation, each of the mobile devices 12 can easily determine if it is required to join the group call by checking the value of the corresponding bit. The time interval can be used to schedule acknowledgement (ACK) messages from the required mobile devices 12 in the representation.

Next, the BTS 14, until a time period times out (step 50), waits for ACK messages from the group members under control (step 52). The mobile device 12 receives the representation of the group call the mobile device 12 can not only determine whether or not it is required for the group call, but can also learn the order in which it should acknowledge. For example, if the representation is a bit string, the mobile device 12 can determine where its tempID is in the bit string, and if its tempID is set to 1, the mobile device 12 can know in what order to send an ACK. For example, if the bit string is 10100, it can mean that the mobile device 12 with tempID1 and the mobile device 12 with tempID3 are required. The bit string would be for a single talkgroup and only have a logical 1 for the mobile devices 12 under its control. Since the mobile device 12 with tempID1 has the first bit value 1 in the bit string, it should send its ACK first. The mobile device 12 with the tempID3 has the second bit value 1 in the bit string, so it should send ACK second, i.e., after the mobile device 12 with the tempID1.

The time interval can be used to sequence or order the ACKs from the required mobile devices 12. For example, assume there are mobile devices 12 with mobile device ID's {ISI_a, ISI_b, ISI_c} with tempIDs {1, 2, 3}, respectively, of group ID X. That is, the tempID list for group ID X is {(1, ISI_a), (2, ISI_b), (3, ISI_c)}. Assume the mobile devices 12 receive representation bits 101 for a group call. The first bit's value is 1 and it's the first value 1, which means ISI_a should join the group call and send its ACK first inside the time period of 1*time_interval where time_interval is the broadcast time interval. The second bit's value is 0, which means ISI_b is not required (or alternatively that ISI_b is not under control of this BTS 14). The third bit's value is 1 and it's the second value 1, which means ISI_c should join the call and send its ACK second inside the time period=2*time_interval.

The overall time period and the time interval can be set according to the range of the BTS, etc. The mobile devices 12 know to ACK in the time interval based on the order in the bit string. In this manner, the BTS 14 can determine, using the tempID, who has or has not acknowledged the group call. Subsequent to a time out (step 50), the group call process 40 check if there are any missing ACKs or decode failures (step 54). That is, if a required mobile device 12 does not acknowledge in its scheduled time interval, it is missing and its tempID is recovered. If there is a decode failure, this means that the tempID may be conflicted. Here, the BTS 14 would treat this as no ACK and set this tempID as idle and broadcast a tempID_invalid message to the associated mobile devices 12 which, upon receiving this message, would start the tempID request process again, e.g., the BTS tempID assignment process 20.

For any of the mobile devices 12 not responding, the BTS 14 can set the associated mobile devices 12 to idle to recover these tempIDs (step 56). Subsequent to the step 56 or if all of the mobile devices 12 indicated in the bit string acknowledged the group call (step 54), the BTS 14 sends the results of the ACKs to the group call server 16 (e.g., a zone controller in TETRA) (step 58). From this information, across all of the BTSs 14, the group call server 16 can determine who is missing from the group call. The group call server 16 would record the missing information for the group call originator. Specifically, the group call server 16 can generate and maintain a table which records attendance of the group members based on acknowledgement status from BTSs 14. For example, the group call server can make and maintain a missing table to track activity:

|  | User | | |
| --- | --- | --- | --- |
| Group | member1 | member2 | . . . |
| Group1 | Data (1,1) | Data (1,2) | . . . |
| Group2 | Data (2,1) | Data (2,2) | . . . |
| Group3 | Data (3,1) | Data (3,2) | . . . |
| . . . | . . . | . . . | . . . |

In the above table, group members (such as based on mobile device ID) are listed in columns and groups (such as based on group ID) are listed in rows. The Data (Row, Column) can indicate—whether or not the group members are part of the associated group and whether or not the group members acknowledged a group call for that group. This table can be reset when a new group call is made and updated as the BTSs 14 provide information regarding acknowledgements to the group call server 16.

Figure 4:
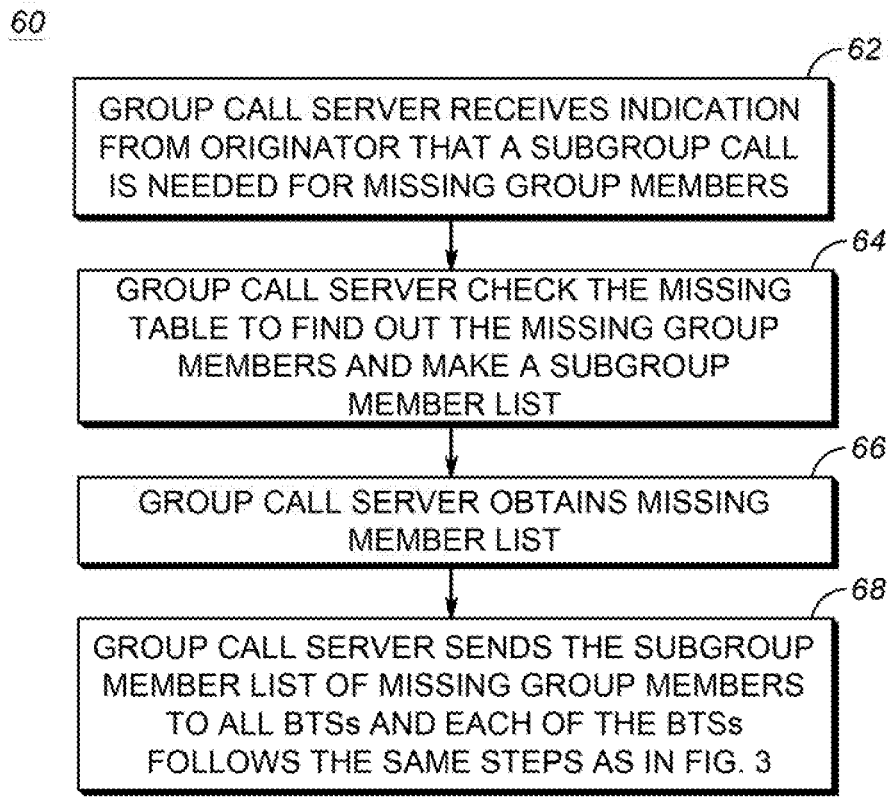
FIG. 4 is a subgroup call process where the originator initiates the subgroup call in accordance with some embodiments.
Figure 5:
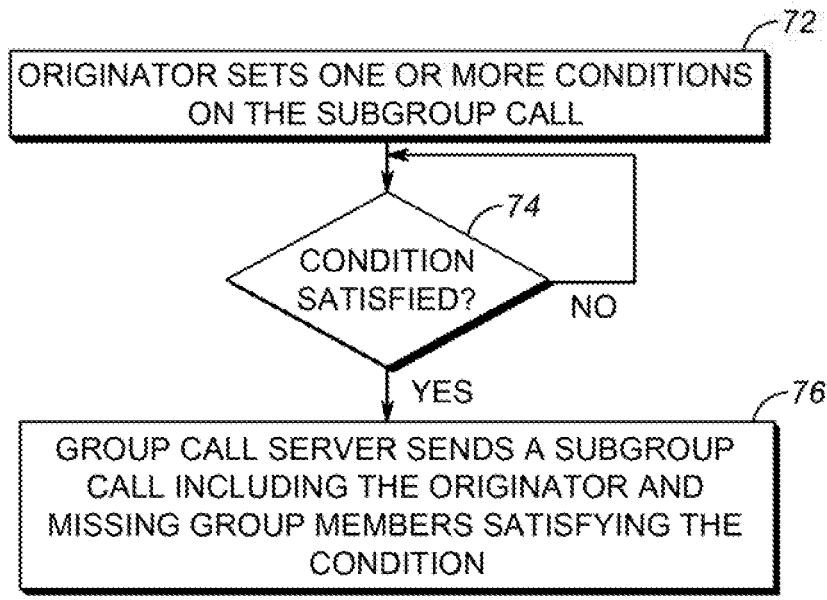
FIG. 5 is a subgroup call process where the originator sets some condition and a group call server makes the subgroup call responsive to the condition in accordance with some embodiments.

FIGS. 4 and 5 are flowcharts of subgroup call processes 60, 70 which allow a group call originator to make a subgroup call with only missing group members. With the BTS tempID assignment process 20 and the group call process 40, the BTSs 14 and the group call server 16 can efficiently determine who has or has not acknowledged a group call. The subgroup call processes 60, 70 provide efficient techniques to make a subgroup call with only the missing group members. FIG. 4 is the subgroup call process 60 where the originator initiates the subgroup call, and FIG. 5 is the subgroup call process 70 where the originator sets some condition and the group call server 16 makes the subgroup call responsive to the condition.

In FIG. 4, the subgroup call process 60 includes the group call server 16 receiving an indication from the originator that a subgroup call is needed for missing group members (step 62). This indication is based on the fact that the originator is making an acknowledge group call and there are missing group members. Specifically, when the originator initiated the group call, the originator indicated that all group members were required, and using the aforementioned processes, the BTSs 14 determine that some of the group members are missing.

In response, the group call server 16 checks a missing table find out the missing group members and makes a subgroup member list with the missing group members (step 64). Specifically, the missing table can be determined from information received from the BTSs 14 after the acknowledgements. Here, the group call server 16 will know which group members acknowledged the group call grant and which did not.

Then group call server 16 sends the subgroup member list of missing group members to all of the BTSs 14 and each of the BTSs 14 follows the same steps as in the group call process 40 of FIG. 3 (step 68). Here, for the subgroup call, the group call server 16 can send the missing group member list together with group call grant message to the BTSs 14. The BTS 14 only needs to do substantially the same steps 44-58 as set forth in FIG. 3 for the original group call, only with the missing group members determined in the process 60.

In FIG. 5, the subgroup call process 70 includes the originator setting one or more conditions on the subgroup call (step 72). Here, the group call server 16 is set to trigger the subgroup call. The conditions can include a number of missing group members who come back to service, a time limitation, etc. For example, when the mobile device 12 comes back to service, it performs the BTS tempID assignment process 20. The BTS 14 can forward this information to the group call server 16 which can then know that a missing group member has come back to service. The subgroup call process 70, when the condition is satisfied (step 74), includes the group call server 16 launching a subgroup call including the originator and missing group members satisfied by the condition. Note, here the originator is included since the group call server 16 is requesting the subgroup call.

In an exemplary embodiment, the subgroup call can be made without the originator mobile device's 12 participation. Here, the group call server 16 can store the audio and/or data of the original call and initiate the subgroup call without the originator mobile device's participation. That is, the processes 60, 70 can be implemented based on the stored audio and/or data from the group call server 16. Here, as part of the group call process 40, after the step 58, the group call server 16 can receive and store the audio and/or data of the group call. When the processes 60, 70 are initiated, the subgroup call can use the audio and/or data of the group call from the group call server 16 thereby eliminating the need for the originator in the subgroup call or allowing the subgroup call to occur after the group call is completed. Thus, all group members can receive the information in the group call.

Figure 6:
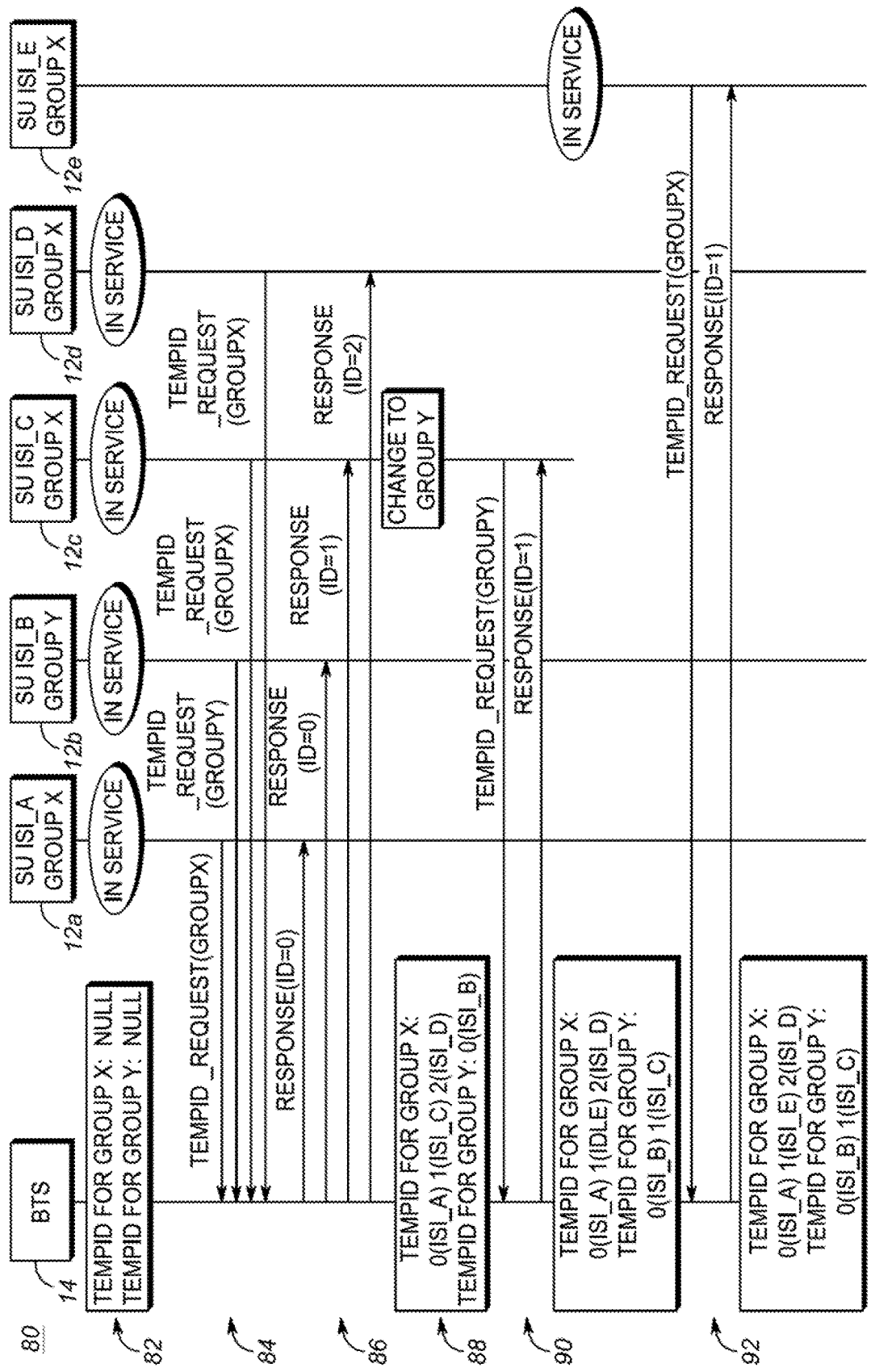
FIG. 6 is a timing diagram of an exemplary operation where a BTS assigns tempIDs to mobile devices in accordance with some embodiments.

FIG. 6 is a timing diagram of an exemplary operation 80 where a BTS 14 assigns tempIDs to mobile devices 12*a*, 12*b*, 12*c*, 12*d*, 12*e*. Here, the BTS 14 has each of the mobile devices 12*a*, 12*b*, 12*c*, 12*d* within its range, and as such, each needs an associated tempID. Note, for illustration purposes, the mobile device 12*e* is shown, but is not in service (i.e., in range of the BTS 14) at the point 82. Also, assume there are two groups associated with the mobile devices 12*a*, 12*b*, 12*c*, 12*d*, 12*e*—group X and group Y. At a point 82, the tempID list for the BTS 14 is empty—tempID list for group X: NULL, tempID list for group Y: NULL, and each of the mobile devices 12*a*, 12*b*, 12*c*, 12*d*, 12*e* has come into service within range of the BTS 14.

At a point 84, each of the mobile devices 12*a*, 12*b*, 12*c*, 12*d* sends a tempID request to the BTS 14 with their associated group. For example, the mobile device 12*a* sends a tempID_request(group X), the mobile device 12*b* sends a tempID_request(group Y), the mobile device 12*c* sends a tempID_request(group X), and the mobile device 12*d* sends a tempID request(group X). Each of the tempID requests is received by the BTS 14 which assigns appropriate tempIDs and responds at a point 86. For example, the BTS 14 assigns the mobile device 12*a* with ID=0 for group X, the mobile device 12*c* with ID=1 for group X, the mobile device 12*d* with ID=2 for group X, and the mobile device 12*b* with ID=0 for group Y.

At a point 88, the mobile device 12*c* changes from group X to group Y and sends a tempID request (tempID_request (group Y)) to the BTS 14. The BTS 14, upon receiving this request, recovers the mobile device 12*c*'s previous temp ID (ID=1 for group X) which is set to idle, and reassigns the mobile device 12*c* with ID=1 for group Y. At a point 90, the mobile device 12*e* comes into service under the BTS 14 and sends a tempID_request (tempID_request(group X)) to the BTS 14. The BTS 14 receives the tempID_request and assigns the mobile device 12*e* with ID=1 for group X which was the previous tempID of the mobile device 12*c*. Note, the BTS 14 can manage the tempIDs as lists for each group and assign the lowest available idle tempID to each new tempID_request for that group.

Figure 7:
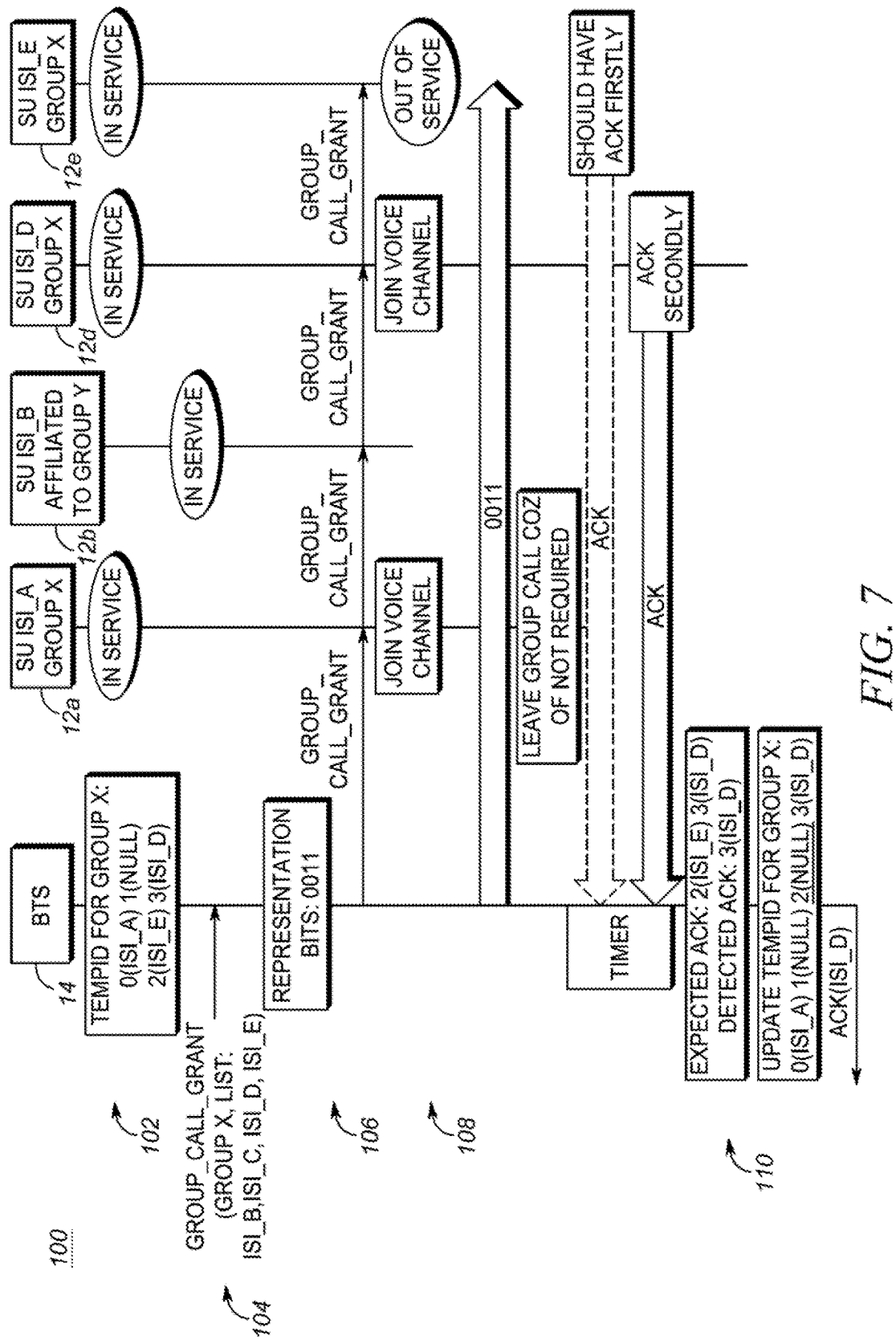
FIG. 7 is a timing diagram of an exemplary operation using the tempID to indicate which group members should join a call and scheduling for acknowledgements in accordance with some embodiments.

FIG. 7 is a timing diagram of an exemplary operation 100 using the tempID to indicate which group members should join a call and scheduling for acknowledgements. The exemplary operation 100 includes the BTS 14 with mobile devices 12a, 12b, 12d, 12e in range and in service. The mobile devices 12a, 12d, 12e are part of a group X and the mobile device 12b is part of a group Y. At a point 102, the tempID list for the group X is ID=0 for the mobile device 12a, ID=1 as NULL, ID=2 for the mobile device 12d, and ID=3 for the mobile device 12e.

At a point 104, there is a group call grant message received by the BTS 14 for group X and for the mobile devices 12c, 12d, 12e. Based on the tempID list for group X, the BTS 14 derives a bit string representation of 0011 for this call and it is included in the group call grant message. At a point 106, the BTS 14 sends a group call grant message to all of the mobile devices 12a, 12b, 12d, 12e. The mobile device 12a could join a voice channel, but does not because it is not required per the bit string representation. The mobile device 12e receives the call grant message, but drops out of service before it can acknowledge. The mobile device 12b ignores the call grant message because it is in the group Y.

At a point 108, the BTS 14 starts a timer for receiving ACKs. In a first time interval, the BTS 14 expects to receive an ACK from the mobile device 12e, but does not since the mobile device 12e has dropped out of service. The mobile device 12e should have acknowledged first based on its tempID. In a second time interval, the mobile device 12d sends an ACK as expected. At an expiration of the timer at point 110, the BTS 14 determines a difference between its expected ACKs—from the mobile device 12d, 12e and its received/detected ACKs—from the mobile device 12d. At a point 112, the BTS 14 updates the tempID list for group X setting ID=2 to NULL from the mobile device 12e, and the BTS 14 forwards the acknowledgments to the group call server 16. Setting ID=2 to NULL means this tempID for group X is now unused and available for reassignment.

Figure 8:
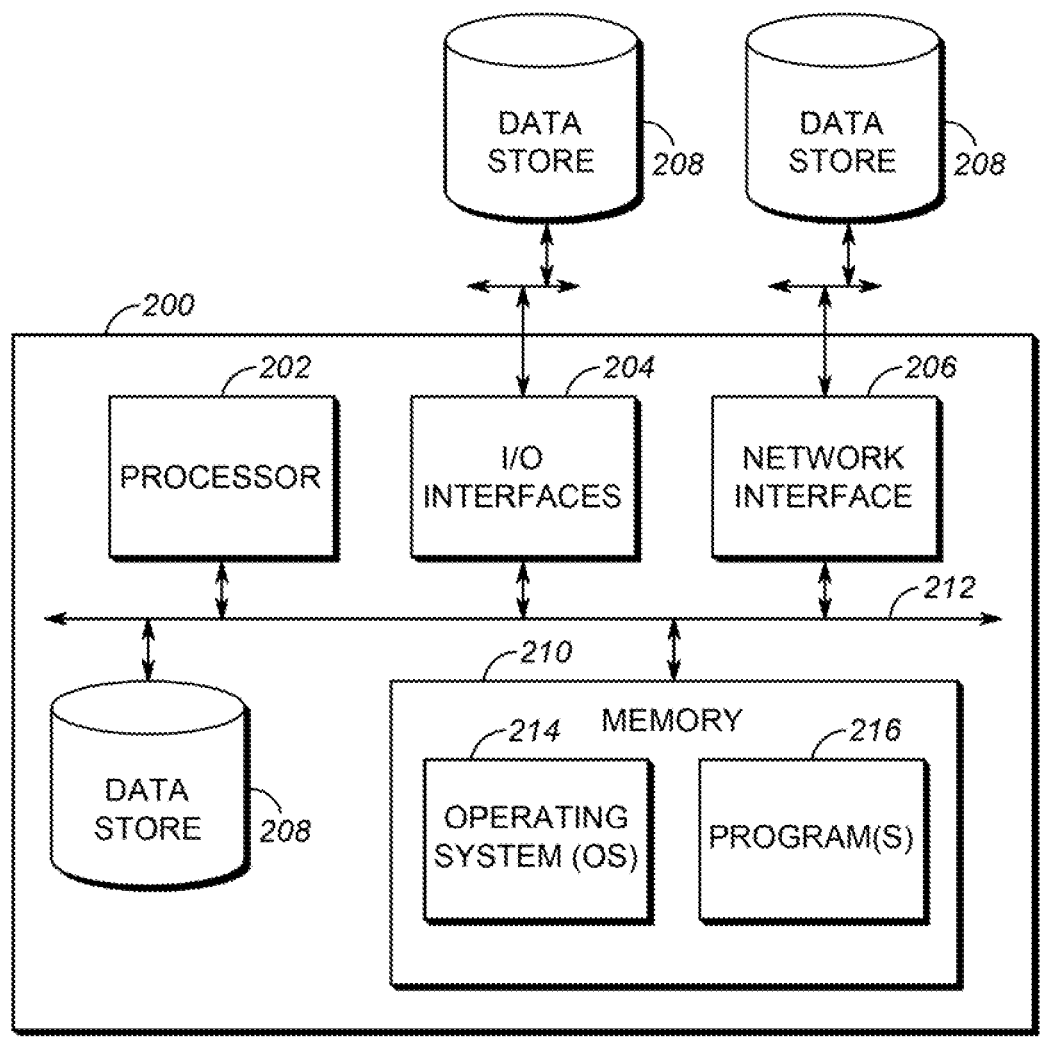
FIG. 8 is a block diagram of a controller for a BTS or a group call server in accordance with some embodiments.

FIG. 8 is a block diagram of a processing system 200 as a controller for the BTS 14 or as the group call server 16. Specifically, the processing system 200 can implement the various processes described herein. The processing system 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 8 depicts the processing system 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the processing system 200, a semiconductor-based microprocessor (in the form of a microchip or chip set), or generally any device for executing software instructions. When the processing system 200 is in operation, the processor 202 is configured to execute software stored within the memory 210, to communicate data to and from the memory 210, and to generally control operations of the processing system 200 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the processing system 200 to communicate on a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 206 may include address, control, and/or data connections to enable appropriate communications in the radio communication system 10. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the processing system 200 such as, for example, an internal hard drive connected to the local interface 212 in the processing system 200. Additionally in another embodiment, the data store 208 may be located external to the processing system 200 such as, for example, an external hard drive connected to the I/O interfaces 204 (e.g., SCSI or USB connection). In a further embodiment, the data store 208 may be connected to the processing system 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, including those BTS or group call server steps described in FIGS. 2-7.

The group call server 16 is communicatively coupled to the mobile devices 12 through the BTSs 14. The group call server 16 can be utilized to manage group calls as well as track a status of each of the mobile devices 12 based on the tempID assignment. For example, the BTS 14 can provide updates to the group call server 16 each time a tempID is assigned or recovered with the associated mobile device. Here, the group call server 16 can know which BTS 14 is associated with which mobile device 12.

The group call server 16 can include the network interface 206 communicatively coupled to one or more BTSs 14; the processor 202 communicatively coupled to the network interface 206; and the memory 210 storing instructions that, when executed, cause the processor 210 to: receive a call request from an originator, wherein the call request comprises a group and list of group members for the call; transmit the call request to all of the one or more BTSs 14; receive acknowledgement status of the list of group members based on using temporary identifiers at the one or more BTSs 14; and initiate a subgroup call for missing group members based on the acknowledgement status. The instructions that, when executed, can further cause the processor to: receive updates from the one or more BTSs 14 based on management of the temporary identifiers; and initiate the subgroup call for missing group members based on the acknowledgement status and the updates.

Figure 9:
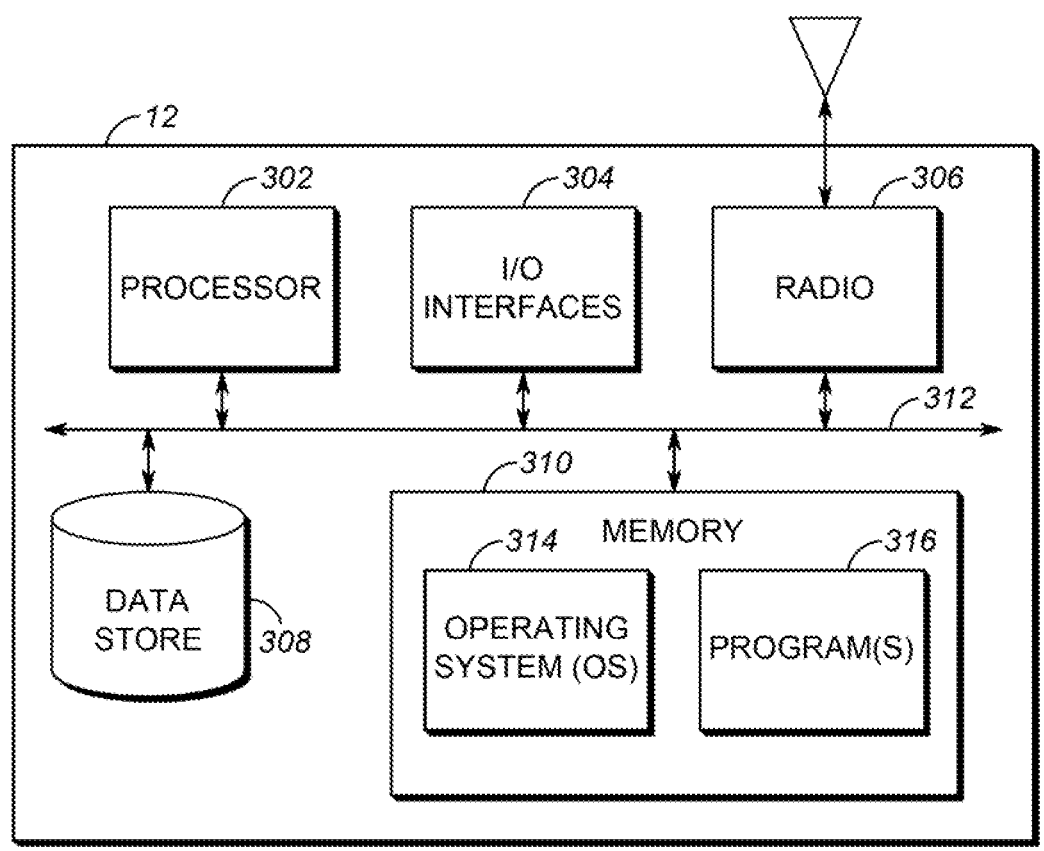
FIG. 9 is a block diagram of a mobile device in accordance with some embodiments.

FIG. 9 is a block diagram of a mobile device 12, which may be used in the radio communication system 10 or the like, in accordance with some embodiments. For example, the mobile device 12 can include, without limitation, a smart phone, a radio, a tablet, a vehicle modem, etc. The mobile device 12 can be a digital device that, in terms of hardware architecture, generally includes a processor 302, input/output (I/O) interfaces 304, a radio 306, a data store 308, and memory 310. It should be appreciated by those of ordinary skill in the art that FIG. 9 depicts the memory 310 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the memory 310, a semiconductor-based microprocessor (in the form of a microchip or chip set), or generally any device for executing software instructions. When the mobile device 12 is in operation, the processor 302 is configured to execute software stored within the memory 310, to communicate data to and from the memory 310, and to generally control operations of the mobile device 12 pursuant to the software instructions. In an exemplary embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the memory 310.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); Land Mobile Radio (LMR); Digital Mobile Radio (DMR); Terrestrial Trunked Radio (TETRA); Project 25 (P25); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 9, the software in the memory 310 includes a suitable operating system (O/S) 314 and programs 316. The operating system 314 essentially controls the execution of other computer programs, and provides scheduling, input-output control, file and data management, memory management, and communication control and related services. The programs 316 may include various applications, add-ons, etc. configured to provide end user functionality with the mobile device 12, including those mobile device functions set forth in FIGS. 2-7.

The mobile device 12 can include a network interface (e.g., the radio 306), the processor 302 communicatively coupled to the network interface; and memory storing instructions that, when executed, cause the processor 302 to: connect to a BTS 14 within range of the network interface; request a temporary identifier from the BTS 14 based on a mobile device identifier and a group of the mobile device 12; receive the temporary identifier from the BTS 14; receive a call grant message comprising a representation of temporary identifiers associated with the group; and determine whether to join a call based on the representation. The instructions that, when executed, can further cause the processor to: utilize the representation to determine when to send an acknowledgment to the call grant message. The mobile device 12 can leave the range of the BTS 14 and the instructions that, when executed, can further cause the processor to: connect to a second BTS 14 within range of the network interface; request a temporary identifier from the second BTS based on the mobile device identifier and the group of the mobile device; receive the temporary identifier from the second BTS 14.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A Base Transceiver Station (BTS) method, the method comprising:

managing mobile devices in range by assigning sequentially increasing temporary identifiers to each of the mobile devices in a group of a plurality of mobile devices as each mobile device requests assignment of a temporary identifier;

receiving a group call grant with a list of required mobile devices in the group for a group call;

defining a representation for the required mobile devices as a bit string where each sequential bit in the bit string is associated with a respective one of the sequentially assigned temporary identifiers, and each bit associated with a mobile device in the list of required mobile devices in the group for the group call is set to a same first logical value, while each bit associated with remaining mobile devices in the group not required for the group call is set to a same second logical value different from the first logical value; and broadcasting the group call grant with the representation, wherein the mobile devices utilize the representation to determine if they are required mobile devices for the group call.

2. The BTS method of claim 1, further comprising:
managing the temporary identifiers as lists for each group of mobile devices.

3. The BTS method of claim 1, further comprising:
receiving a request for a first temporary identifier from a first mobile device when the first mobile device comes back to service or switches to a new group, wherein the request comprises a mobile device identifier of the first mobile device and a group identifier of a group the first mobile device is affiliated with; and
assigning the lowest available sequential temporary identifier to the first mobile device from a list of idle temporary identifiers available for the group.

4. The BTS method of claim 3, further comprising:
creating a new list of temporary identifiers for the group if there is no existing list of temporary identifiers for the group.

5. The BTS method of claim 3, further comprising:
recovering a previous temporary identifier for the mobile device if the mobile device was previously assigned the previous temporary identifier prior to the request.

6. The BTS method of claim 1, further comprising:
broadcasting the group call request with the representation and a time interval for scheduling acknowledgments from the mobile devices in the group call in the sequential order as defined by the bits in the representation having the first logical value set forth in the representation.

7. The BTS method of claim 6, further comprising:
receiving acknowledgments from the mobile devices in the representation in the sequential order defined by the bits in the representation having the first logical value;
updating a group call server of which of the mobile devices in the representation responded at an end of a time period; and
updating the temporary identifiers for any mobile devices in the representation which did not respond with an acknowledgement.

8. The BTS method of claim 1, further comprising:
determining which of mobile devices in the representation which did not respond to the group call grant; and
initiating a subgroup call using the representation to set bits associated with each mobile device that did not respond to the same first logical value.

9. The BTS method of claim 1, further comprising:
updating a group call server of which of the mobile devices in the representation did not respond to the group call grant; and
notifying the group call server of conditions for the group call server initiating a subgroup call for the mobile devices in the representation which did not respond to the group call grant using the representation to set bits associated with each mobile device which did not respond to the group call grant to the same first logical value.

10. The BTS method of claim 9, further comprising:
providing updates to the group call server related to assignments of the temporary identifiers; and
receiving a subgroup call request from the group call server based on the conditions.

11. A mobile device, comprising:
a wireless network interface;
a processor communicatively coupled to the network interface; and
memory storing instructions that, when executed, cause the processor to:
 connect to a Base Transceiver Station (BTS) within range of the wireless network interface;
 request a next sequentially assigned temporary identifier from the BTS based on a mobile device identifier and a group of the mobile device;
 receive the next sequentially assigned temporary identifier from the BTS;
 receive a group call grant message for a group call comprising a representation for the required mobile devices as a bit string where each sequential bit in the bit string is associated with a respective one of the sequentially assigned temporary identifiers, and each bit associated with a mobile device in a list of required mobile devices in the group for the group call is set to a same first logical value, while each bit associated with remaining mobile devices in the group not required for the group call is set to a same second logical value different from the first logical value; and
 determine whether to join the group call based on the next sequentially assigned temporary identifier and the representation.

12. The mobile device of claim 11, wherein the memory storing the instructions that, when executed, further cause the processor to:
utilize the representation to determine when to send an acknowledgment to the group call grant message.

13. The mobile device of claim 11, wherein the mobile device leaves the range of the BTS and the memory storing the instructions that, when executed, further cause the processor to:
connect to a second BTS within range of the network interface;
request a temporary identifier from the second BTS based on the mobile device identifier and the group of the mobile device; and
receive the temporary identifier from the second BTS.

14. A group call server, comprising:
a network interface communicatively coupled to one or more Base Transceiver Stations (BTSs);
a processor communicatively coupled to the network interface; and
memory storing instructions that, when executed, cause the processor to:
manage mobile devices in range by assigning sequentially increasing temporary identifiers to each of the mobile devices in a group of a plurality of mobile devices as each mobile device requests assignment of a temporary identifier;
receive, via the network interface, a group call grant with a list of required mobile devices in the group for a group call;
define a representation for the required mobile devices as a bit string where each sequential bit in the bit string is associated with a respective one of the sequentially assigned temporary identifiers, and each bit associated with a mobile device in the list of required mobile devices in the group for the group call is set to a same first logical value, while each bit associated with remaining mobile devices in the group not required for the group call is set to a same second logical value different from the first logical value; and broadcast, via the network interface, the group call grant with the representation, wherein the mobile devices utilize the representation to determine if they are required mobile devices for the group call.

15. The group call server of claim 14, wherein the memory storing the instructions that, when executed, further cause the processor to:

receive updates from the one or more BTSs based on management of the temporary identifiers; and initiate the subgroup call for missing group members based on the acknowledgement status and the updates using the representation to set bits associated with each missing group member to the same first logical value.

16. The group call server of claim 15, wherein the memory storing the instructions that, when executed, further cause the processor to:

record and store audio and/or data from a group call associated with the group call request; and provide the audio and/or data for the subgroup call for the missing group members.

* * * * *